Oct. 15, 1963
P. C. SHERBURNE
3,106,992
SHOCK ABSORBER FOR FLUID SYSTEMS
Filed March 13, 1961
2 Sheets-Sheet 1
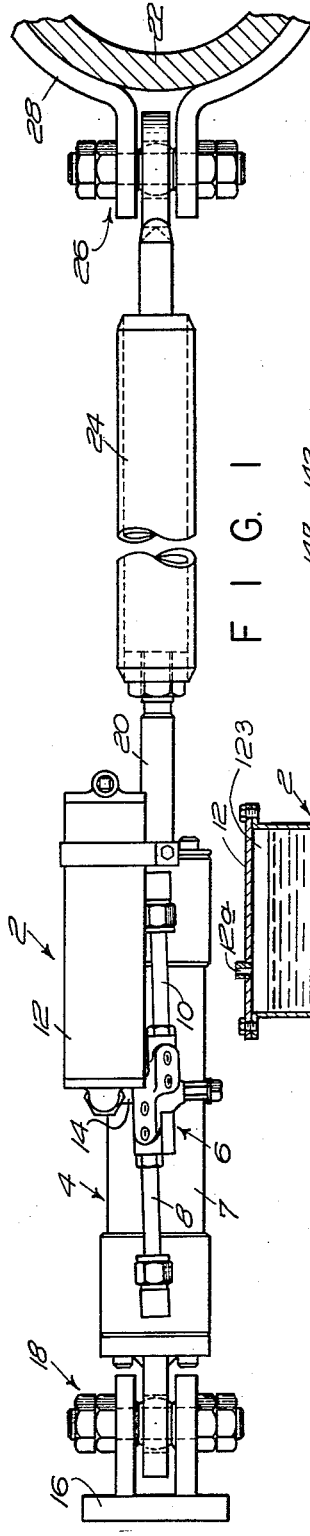
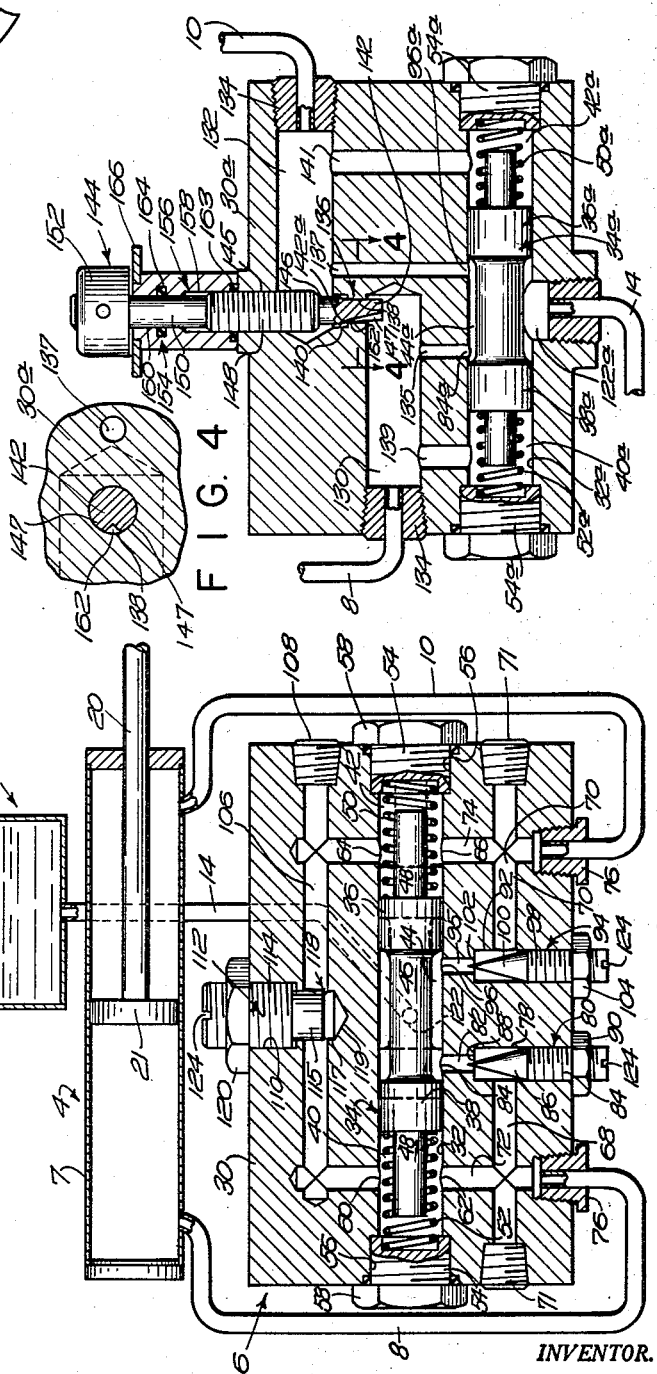
INVENTOR.
PHILIP C. SHERBURNE
BY
ATTORNEY

INVENTOR.
PHILIP C. SHERBURNE 3,106,992
SHOCK ABSORBER FOR FLUID SYSTEMS
Philip C. Sherburne, Rumford, R.I., assignor to Grinnell Corporation, Providence, R.I., a corporation of Delaware
Filed Mar. 13, 1961, Ser. No. 95,306
12 Claims. (Cl. 188—87)

The present invention relates to an improved shock absorber, commonly referred to as a sway brace, for fluid handling systems, such as steam piping systems.

Such systems normally are supported so that they can move relatively slowly over a range of movement due to thermal contraction or expansion in response to temperature changes of the system. They are normally subjected to relatively mild shock and vibrations but at times may be subjected to relatively violent shock.

A shock absorber for such systems must be capable of accommodating slow movement thereof due to thermal changes without undue interference. Furthermore, to effectively absorb and damp mild shock and vibrations a shock absorber having relatively low stiffness characteristics is required. On the other hand, to effectively absorb violent shock, substantially higher stiffness characteristics are required. A shock absorber which has good stiffness characteristics to damp mild shock is not stiff enough to resist and take up violent shock and breakage of the pipe is apt to occur due to such violent shock. On the other hand, a shock absorber having sufficient stiffness to resist violent shock is too stiff for mild shock.

It is an object of the present invention to provide a dependable hydraulic shock absorber or sway brace which will not interfere with slow movement of the system due to temperature changes thereof, which has good, relatively low stiffness characteristics for effectively absorbing and damping mild shock and vibration and which automatically increases its stiffness characteristics and resistance to shock in response to violent shock to thereby effectively absorb such violent shock.

These objects are achieved in accordance with a preferred embodiment of the invention by providing (1) a piston and cylinder assembly between the piping system and a structure (2) a fluid conduit system between the two sides of the piston comprising a main conduit having a restriction therein and a by-pass conduit also having a restriction therein, preferably much smaller in size than the restriction in the main conduit, and (3) a valve assembly in the conduit system comprising valve means normally positioned so that the main conduit is open but movable automatically in response to shock in excess of a predetermined magnitude to close the main conduit but leaving open the bypass conduit.

The restrictions function to restrict the rate of flow between the sides of the piston and to automatically actuate the valve means. They are so located that a pressure differential is automatically built up in the valve assembly in reponse to movement of the piston caused by shock and is applied to the movable valve means to automatically move it as aforesaid, the amount of such pressure differential being determined by the magnitude of the shock. Means are provided to yieldably and resiliently resist the above-mentioned movement of the valve means caused by the pressure differential. The pressure differential built up in response to shocks in excess of said predetermined magnitude is effective to overcome the yieldable and resilient means sufficiently to move the valve means to close the main conduit. However, the pressure differential created by shocks of lesser magnitude or by thermal movement of the piping is inadequate to overcome the yieldable and resilient means sufficiently to close the main conduit so that the main conduit remains open.

In a preferred embodiment, a reservoir is provided which communicates with the main conduit and by-pass conduit at all times during operation. The reservoir is so located that it is always connected with such conduit system at the low pressure side of the restrictions therein. The function of the reservoir is to compensate for leakage and for the difference in volume change at the opposite sides of the piston in response to movement of the piston and due to the volume occupied by the piston rod at one side of the piston.

Further objects and advantages of the present invention will be apparent from the following description and the accompanying drawings in which preferred embodiments of the present invention are described and shown for illustrative purposes only.

In the drawings:

FIG. 1 is a plan view partially in section showing an installation of a shock absorber embodying the present invention.

FIG. 2 is a partially diagrammatic view in section of the shock absorber of FIG. 1.

FIG. 3 is a view like FIG. 2 of another embodiment of the valve assembly of the invention.

FIG. 4 is a section taken along the line 4—4 of FIG. 3.

Figure 5:
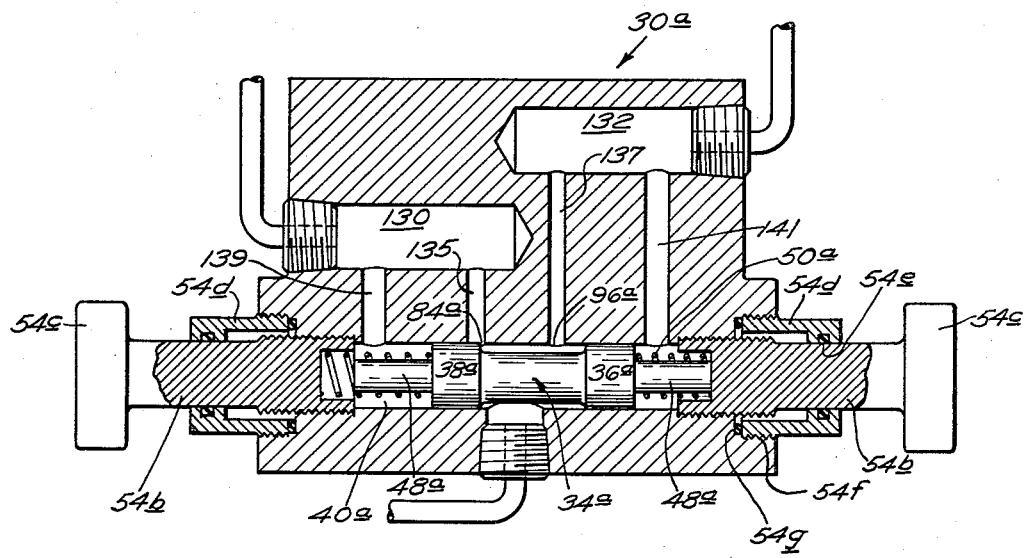
FIG. 5 is a view like FIG. 3 of yet another embodiment of the invention in which the fluid passage is the same under violent shock conditions, mild shock conditions and thermal movement conditions.

With reference to the drawings, 2 represents a shock absorber embodying the invention and comprising a piston and cylinder assembly 4, a valve assembly 6 mounted on the cylinder 7 of the piston and cylinder assembly, fluid conduits 8 and 10 connecting the piston and cylinder assembly with the valve assembly, a vented fluid reservoir tank 12 mounted on cylinder 7 and a reservoir conduit 14 connecting the reservoir with the valve assembly.

The cylinder 7 of the piston and cylinder assembly 4 is connected with building structure 16 through a conventional universal joint 18. The piston rod 20 of the piston and cylinder assembly extends from piston 21 and is connected to a section of pipe 22 of a steam piping system through a conventional turnbuckle assembly 24, a conventional universal joint 26 and a conventional pipe strap 28.

The valve assembly 6 comprises a valve body 30 having a longitudinal center bore or passage 32 therethrough slidably receiving a valve piston 34 having a pair of spaced, enlarged lands 36 and 38 which divide the bore or passage 32 into a first end chamber 40, an opposite second end chamber 42 and a center chamber 44. The lands 36 and 38 of the valve piston 34 fit snugly but slidably in the bore 32.

Valve piston 34 has a reduced diameter center portion 46 between the lands 36 and 38 thereof, to thereby provide the center chamber 44, and a reduced diameter end portion 48 extending outwardly from each of the lands 36 and 38 to seat a pair of coil springs 50 and 52 biased between the opposite ends of valve piston 32 and a pair of threaded plugs 54 which are threaded into threaded enlarged end portions 56 of bore 32 to close the ends of bore 32 and which have enlarged hexagonal heads 58.

End chamber 40 has a pair of opposed ports 60 and 62 and end chamber 42 has a like pair of opposed ports 64 and 66.

Valve body 30 has a pair of axially aligned bores 68 and 70 drilled into the opposite ends thereof and which are parallel to the bore 32. The ends of these bores are closed by threaded plugs 71. Bore 68 and bore 32 are intersected by a bore 72 which is perpendicular to bore 68 and 32 and which is drilled into one side of the valve body, as shown. Bore 70 and bore 32 are intersected by a bore 74 which is parallel to and spaced from bore 72 and perpendicular to bores 70 and 32 and which is drilled into the same side of the valve body as bore 72. The intersection of bore 72 with bore 32 provides the ports 60 and 62 and the intersection of bore 74 with bore 32 provides the ports 64 and 66.

The left hand side of the cylinder 7 to the left of the piston 21, as viewed in FIG. 2, is connected in a fluid-tight manner with bore 72 through conduit 8, an end of which is attached to the valve body by a tapered connector 76, which is threaded into an enlarged, tapered, threaded end of bore 72. The right hand side of cylinder 7 to the right of piston 21, as viewed in FIG. 2, is connected in a fluid tight manner with bore 74 through conduit 10, an end of which is attached to the valve body by another tapered connector 76, which is threaded into an enlarged, tapered, threaded end of bore 74.

The end of bore 68 intersects an enlarged portion 78 of a bore 80 which is drilled into the same side of the valve body as bores 72 and 74, which is parallel to bores 72 and 74 and which has a reduced end portion 82, which intersects the bore 32 to provide a port 84 in the center chamber 44.

An adjustable, externally threaded needle valve 84 having a conical needle valve end portion 86 is threaded into the enlarged portion 78 of bore 80, as shown, with conical needle valve end portion 86 thereof extending into the reduced end portion 82 of bore 80 to provide an adjustable restriction 88. The size of the restriction can be adjusted by threading the needle valve 84 more or less into the bore 80 and the needle valve may be locked in adjusted position by lock nut 90.

The end of bore 70 intersects the enlarged portion 92 of a bore 94 which is like bore 80, which is drilled into the same side of the valve body, which is parallel to and spaced from bores 80, 72 and 74 and the reduced end portion 95 of which intersects the bore 32 to form a port 96 in the center chamber 44 of bore 32.

A needle valve 98 like needle valve 84 is adjustably threaded into the enlarged portion of bore 94 with the conical needle valve end portion 100 thereof extending into the reduced portion 95 of bore 94 to form an adjustable restriction 102. Needle valve 98 may be locked in adjusted position by lock nut 104.

Spaced bores 72 and 74 also intersect a bore 106 which is drilled into the same end of the valve body as bore 70, which is spaced from and parallel with bore 32 and which is located on the side of bore 32 opposite from the side on which bores 68 and 70 are located. The end of bore 106 is plugged by a threaded plug 108.

Another bore 110 drilled in the side of the valve body opposite from the side in which bores 72 and 74 are drilled intersects the center portion of bore 106, as shown. Bore 110 extends across bore 106 into a reduced end portion 117 which extends into a conical end 119.

A valve 112 having an enlarged threaded portion 114 and a reduced diameter shank portion 115 is threaded into bore 110, as shown, with the shank 115 extending across and blocking the bore 106, as shown except for passage through the space 118 between the bottom of shank 115 and the opposed lower wall of passage 106. The end of shank 115 is adapted to be received in portion 117 of bore 110, as shown, to completely close the space 118 and hence bore 106 when the needle valve 112 is threaded into bore 110 as far as it will go. Space 118 comprises a restriction in the bore 106 which is preferably substantially smaller than either of the restrictions 88 and 102. The size of restriction 118 can be adjusted by threading the valve 112 more or less into the valve body to decrease or increase the distance between the bottom of shank portion 115 and the opposed portion of bore 106. Valve 112 can be locked in any adjusted position by lock nut 120.

Fluid reservoir tank 12 communicates with center chamber 44 through reservoir conduit 14 and a bore 122 in the valve body, the intersection of bore 122 with the center chamber 44 comprising a reservoir port 122. Tank 12 is vented to the atmosphere through vent 12a.

Each of the valves 84, 98 and 112 are provided with a slot 124 by means of which the valve is adapted to be turned and thereby threaded more or less into the valve body.

Springs 50 and 52 normally center the valve piston 34 in the center position shown in full lines in FIG. 2 in which position the ports 84, 96 and 122 are open. When the valve piston is in this position, conduit 8, the portion of bore 72 below the intersection thereof with bore 68, as viewed in FIG. 2, bore 68, bore 80, open port 84, center chamber 44, open port 96, bore 94, bore 70, the portion of bore 74 below the intersection thereof with bore 70 and conduit 10 comprise a main conduit providing communication between the opposite sides of piston 21. The left side of piston 21 also communicates with end chamber 40 through conduit 8, the portion of bore 72 below the intersection thereof with bore 32 and open port 62, and the right side of piston 21 communicates with end chamber 42 through conduit 10, the portion of bore 74 below the intersection thereof with bore 32 and open port 66. Bore 106, the portions of bores 72 and 74 above the intersection thereof with bore 32 and open ports 60 and 64 comprise a by-pass line providing communication between the two end chambers 40 and 42, such by-pass line together with the chambers 40 and 42, ports 62 and 66, the portions of bores 72 and 74 below bore 32 and the conduits 8 and 10 comprising a by-pass conduit between the two sides of the piston 21. The reservoir tank 12 communicates with center chamber 44 through conduit 14 and open port 122.

The cylinder 7, conduits 8, 10 and 14 and the bores in the valve body are full of hydraulic fluid. The reservoir tank is partially full of hydraulic fluid with an air space 123 above the fluid level.

In the event that the pipe 22 is subjected to a mild shock to the left as viewed in FIGS. 1 and 2 or is moved slowly to the left in response to a change in temperature, piston 21 is moved to the left whereby hydraulic fluid is forced to flow from the left hand side of piston 21 through conduit 8, bores 72, 68 and 80, restriction 88, open port 84, center chamber 44, open port 96, restriction 102 in bore 94, bores 70 and 74 and conduit 10 to the right side of piston 21. The restrictions 88 and 102 restrict the rate of such flow to thereby resist such movement of piston 21 in response to the mild shock, whereby such shock is damped or absorbed.

Because of the piston rod 20, the volume increase at the right of piston 21 due to the movement of the piston is less than the volume decrease at the left of the piston. The excess fluid from the left side of the piston flows from center chamber 44 through open port 122 and conduit 14 to reservoir tank 12.

Where the movement of piston 21 is due to temperature changes in the pipe, it is relatively slow and the rate of flow through restrictions 88 and 102 is adequate to permit such movement to occur with substantially no interference. On the other hand, in the case of a shock which would result in a greater rate of movement of the piston if such movement was unrestricted, the restricted rate of flow through restrictions 88 and 102 resists such movement and thereby damps or absorbs the shock.

At the same time that fluid is forced to flow from the left side of the piston 21 to the right side of the piston by the aforesaid route, which includes restrictions 88 and 102, it is also forced to flow from the left side of piston 21 to the right side thereof through the by-pass conduit, namely, conduit 8, bore 72, end chamber 40, bore 106, restriction 118, bore 74, end chamber 42 and conduit 10. However, since restriction 118 is substantially smaller than either of the restrictions 88 or 102, the maximum rate of flow is primarily determined by the restriction 88 or 102, whichever is larger.

Because of the restrictions 88, 102 and 118, the above-mentioned movement of piston 21 in response to shock causes the pressure at the left side of piston 21 and in conduit 8, bores 72 and 68, end chamber 40 and the portion of bore 106 to the left of restriction 118 to increase relative to the pressure at the right side of piston 21 and in conduit 10, bores 74 and 70, end chamber 42 and the portion of bore 106 to the right of restriction 118 (pressure drop across the restrictions) to thereby provide a pressure differential between the chambers 40 and 42, which pressure differential is applied to the opposite ends of the valve piston 34 located in such chambers. Since the cross sectional areas of the end chambers 40 and 42 are equal, the end faces of the valve piston 34 located in such chambers are equal and the strength of both springs 50 and 52 are equal, the above-mentioned pressure differential between such chambers causes the total force exerted on the left end of valve piston 34 to exceed the total force exerted on the right end thereof thereby tending to move the piston to the right against the force exerted thereon by the right spring 50. The increased pressure in end chamber 40 and hence the above-mentioned pressure differential and increased force on the left end of the valve piston tending to move it to the right varies with the magnitude of the shock, the greater the shock the greater the pressure build-up in chamber 40, the greater the above-mentioned pressure differential and the greater the increase in the total force exerted on the left end of the valve piston relative to the force exerted on the right end of the valve piston. The strength of springs 50 and 52 are selected to prevent movement of the valve piston 34 to the right far enough for land 38 to cover port 84 in response to pressure differential in the end chambers 40 and 42 resulting from thermal movement of the pipe or from mild shocks which do not exceed a predetermined magnitude so that the size of the larger of the restrictions 88 and 102 primarily controls the resistance to such mild shocks and such thermal movement.

However, when the shock exceeds this predetermined magnitude, the pressure in chamber 40 and hence the pressure differential between end chambers 40 and 42 are increased to a magnitude at which the force on the left end of the valve piston overcomes the opposing force of spring 50 sufficiently to move the valve piston to the position shown in dotted lines in FIG. 2 in which the port 84 is covered, thereby closing the main conduit between the two sides of the piston, but in which the ports 60, 62, 122, 96, 64 and 66 remain open, whereby flow of fluid between the opposite sides of the piston is limited to flow through the by-pass conduit, namely, passages 72 and 74, chambers 40 and 42 and by-pass line 106 with the smaller restriction 118 to thereby increase the resistance to movement of piston 21 in response to more violent shocks. Since ports 96 and 122 remain open, excess fluid due to the volume occupied by piston rod 20 flows through bores 70 and 94, restriction 102, center chamber 44, bore 122 and conduit 14 to the reservoir chamber.

Spring 50 automatically returns the valve piston 34 to its normal position shown in full lines when the pressure differential between the end chambers 40 and 42 is relieved.

The effect of shocks in a left hand direction has been described above. When the shock or thermal movement of the pipe 22 is to the right, as viewed in FIG. 2, the action and flow is reversed.

It is noted that the reservoir tank 12 is not exposed to the shock pressures developed in chambers 40 or 42.

The magnitude of the shock which will actuate the valve piston 34 to close one of the ports 84 or 96 and thereby increase resistance to shock can be adjusted by adjusting the sizes of the restrictions 88 and 102 as well as by adjusting the tension of the springs. Adjustment of restrictions 88 and 102 also regulates the stiffness of the shock absorber for mild shocks whereas adjustment of the restriction 118 adjusts the stiffness of violent shocks.

With respect to shocks over a limited range of magnitude, either port 84 or 96 will only be partially covered to thereby increase resistance to flow, such resistance increasing gradually over such range. However, because the restrictions 88 and 102 are so much smaller than these ports, the effect of partial port closing will be a minor factor over the major portion of this range. Accordingly, pressure build-up for actuating the valve is primarily controlled by restrictions 88 and 102 over such major portion.

FIGS. 3 and 4 show a slightly different embodiment of the valve assembly in which bore 32a, end chambers 40a and 42a, center chamber 44a, ports 84a, 96a and 122a, valve piston 34a and its lands 36a and 38a, springs 50a and 52a and plugs 54a correspond to bore 32, end chambers 40 and 42, center chamber 44, ports 84, 96 and 122, valve piston 34 and its lands 36 and 38, springs 50 and 52 and plugs 54 of the FIG. 2 embodiment.

However, conduit 8 is connected to the end of bore 130 in the valve body 30a and conduit 10 is connected to the end of bore 132 in the valve body by means of tapered, threaded connectors 134.

Bore 130 communicates with center chamber 44a through a restricted passage 135 and port 84a and bore 132 communicates with center chamber 44a through a restricted passage 137 and port 96a to provide a main conduit between the opposite sides of piston 21 made up of conduit 8, passage 130, restricted passage 135, center chamber 44a, restricted passage 137, passage 132 and conduit 10. Restricted passages 135 and 137 comprise restrictions in such main conduit and correspond to the restrictions 88 and 102 respectively in the FIG. 2 embodiment, except that they are not adjustable. They create a pressure differential between end chambers 40a and 42a in the same way that restrictions 88 and 102 create a pressure differential between chambers 40 and 42 in FIG. 2.

Bore 130 also communicates with end chamber 40a through passage 139 and bore 132 communicates with end chamber 42a through passage 141. Passages 139 and 141 correspond to the portion of bore 72 between bores 68 and 32 and the portion of bore 74 between bores 70 and 32 in the FIG. 2 embodiment.

However, in the embodiment of FIGS. 3 and 4, the by-pass line around the valve corresponding to bore 106 in the FIG. 2 embodiment comprises the passage 136 between the inner end portions of bores 130 and 132. By-pass passage 136 comprises a reduced diameter lower end portion 138 and an enlarged upper end portion 140.

The reduced diameter portion 138 of the by-pass line 136 snugly but rotatably receives the reduced valve end portion 142 of a valve 144 which is threaded into a threaded passage 145 in the valve body 30a, as shown in FIG. 3, and which corresponds to valve 112 in the FIG. 2 embodiment. Threaded passage 145 is axially aligned with by-pass passage 136.

The reduced valve end portion 142 has a V-slot 147 which extends longitudinally from one end thereof to the other and which gradually increases in depth from zero depth at the upper end of portion 142 to a maximum depth at the lower end of portion 142. The V-slot and the opposed wall of the reduced portion 138 of passage 136 from an adjustable restriction or orifice 162 corresponding to restriction or orifice 118 in the FIG. 2 embodiment. The snug fit between portion 142 of the valve and passage 138 blocks passage of fluid through by-pass passage 136 except through restriction 162. The reduced end valve portion 142 extends upwardly into a wider portion 146 which is loosely received within the wider portion 140 of bypass passage 136 so that fluid can flow therebetween, which is joined with portion 142 by a short tapered portion 142a and which extends upwardly into a wider threaded portion 148, which is in turn received in the threaded passage 145 and extends upwardly into a narrow neck portion 150 which has attached to the upper end thereof a knob 152 for rotating the valve 144 to thread it more or less into the valve body and thereby move it axially to adjust the size of orifice 162.

The upper portion of valve 144 is received in a cap 154 which is attached to valve body 30a and which has a longitudinal passage 156 therethrough axially aligned with passage 145 and through which the valve 144 extends. Passage 156 comprises a threaded, wider lower portion 158 threadedly receiving the upper part of threaded portion 148 of the valve and a reduced upper portion 160 snugly but rotatably receiving the neck portion 150 of valve 144.

O-rings 163 and 164 provide seals to prevent leakage of fluid between the valve and the walls of passages 145 and 156.

The top of the cap 154 has a disk 166 attached thereto provided with graduations for indicating the rotative position of the valve which is an indication of the axial position of the valve and hence the size of restriction 162.

When the valve 144 is moved downwardly as far as it can go, the size of the restriction or orifice 162 is reduced to substantially zero and the tapered portion 142a between portions 142 and 146 of the valve seats against the shoulder formed by the portions 138 and 140 of the by-pass passage 136 to thereby close such passage. In operation, the orifice 162 is adjusted so that it is substantially smaller than the restrictions 135 and 137 just as in the FIG. 2 embodiment.

Port 122a in center chamber 44a is connected with the reservoir tank 12 through conduit 14 just as in the FIG. 2 embodiment.

The valve assembly of FIGS. 3 and 4 works in the same way as that of FIG. 2. Movement of the piston 21 to the left in response to mild shock or thermal movement of the piping 22 forces fluid to flow from the left side of the piston to the right side through conduit 8, passage 130, restriction 135, open port 84a, center chamber 44a, open port 96a, restriction 137, passage 132 and conduit 10. Restrictions 135 and 137 restrict the rate of flow between the sides of the piston and thereby resist the movement of the piston to damp the shock.

Fluid also is forced to flow from the left side of piston 21 to the right side thereof through conduit 8, passage 130, restriction 162 in by-pass line 136, passage 132 and conduit 10 but because the restriction 162 is substantially smaller than the restrictions 135 and 137 maximum resistance to movement of the piston is determined primarily by the larger of the latter two restrictions. Preferably restrictions 135 and 137 are substantially equal in size.

As in the FIG. 2 embodiment, the restriction 135, 137 and 162 create a pressure differential between the chambers 40a and 42a in response to shock, which pressure differential moves the valve piston 34a to the right against the force of spring 50a to a position in which land 38a covers port 84a to thereby close the main conduit, namely, passage 130, restriction 135, center chamber 44a, restriction 137 and passage 132, when the shock exceeds a predetermined magnitude, whereupon flow between the sides of the piston is restricted to flow through the orifice or restriction 162 to thereby increase resistance to movement of the piston 21.

Also, as in the FIG. 2 embodiment, make up fluid and excess fluid flow to and from the reservoir tank 12 through the conduit 14 and center chamber 44a.

Movement of the piston 21 in the opposite direction in response to shock or thermal movement causes flow of fluid and movement of the valve piston in an opposite direction as in the FIG. 2 embodiment.

Because the ports 84a and 96a in FIG. 3 constitute the restrictions for mild shock and thermal movement, in the normal position of valve piston 34a, the lands 36a and 38a should preferably be spaced from the ports so that movement of the piston caused by mild shocks will not cause substantial closing of the ports. Such closing under mild shock might close the main conduit, which is a condition intended to be reserved for more violent shock. This spacing of the lands from the ports is not so important in the FIG. 2 embodiment because the ports are so much larger.

Although in the embodiments described the restriction in the by-pass conduit is smaller than the restrictions in the main conduit, the resistance to shock is determined by the total rate of flow through both conduits so that even if the restrictions are of the same size closing of the main conduit decreases total rate of flow to increase resistance.

FIG. 5 shows another embodiment like FIG. 3 but in which the by-pass conduit 136 is eliminated and in which greater resistance to flow is automatically provided for violent shock by movement of the valve piston 34a in response to shock in excess of a predetermined magnitude to a position as shown in FIG. 5 in which it restricts flow through the main conduit by land 38a or 36a partially covering port 84a or 96a respectively as the case may be.

In such position, an end portion 48a of the valve piston 34a strikes adjustable plug 54b to stop further movement of the valve piston beyond such position to thereby determine the area of port 84a or 96a which remains uncovered by the land 38a or 36a.

Plug 54b is threaded into the body of the valve and is provided with a knob 54c for threading the plug more or less into the valve body, and a cap 54d sealed against the plug by seal 54e and secured to the body by threads 54f with a further O-ring seal 54g.

Thus resistance to mild shock and thermal movement of the pipe is determined by the size of restrictions 37a and 39a as in the FIG. 3 embodiment whereas resistance to violent shock is determined by the smaller size of the restriction formed by the uncovered area of port 84a or 96a when the valve piston has been automatically moved to the position shown in response to such violent shock. The action of the valve piston is the same except that the plugs 54b prevent the lands from completely covering the ports as in the FIG. 3 embodiment.

While three particular embodiments of the invention have been described and shown it is to be understood that modifications within the scope and spirit of the invention will occur to those skilled in the art. The invention is not intended to be limited to such embodiments, which are only for illustrative purposes, but only by the claims hereof and their equivalents.

I claim:

1. A hydraulic shock absorber for a system for handling fluids, said shock absorber comprising a piston and cylinder, one of which is adapted to be connected to said system and the other of which is adapted to be connected to a structure, a fluid conduit system providing communication between the two sides of said piston, means for normally restricting the rate of fluid flow through said conduit system, means responsive to shock in excess of a predetermined magnitude to further restrict said rate of flow, said last-mentioned means comprising movable valve means responsive to shock in excess of said predetermined magnitude to automatically effect said further restriction of said rate of flow, a fluid reservoir, said valve means comprising a valve piston slidably received in a passage and dividing said passage into a first chamber located in said conduit system and having a first port connected with one side of said piston through a restriction, a second port connected with the other side of said piston through a second restriction and a third port connected with said reservoir, and a pair of control chambers one of which is connected to one side of said piston and the other of which is connected to the other side of said piston, said valve piston being movable in response to shock in excess of said predetermined magnitude to cooperate with said first and second ports to effect said further restriction of said rate of flow while leaving said third port open.

2. A shock absorber according to claim 1, a third restriction located in a by-pass line between said control chambers and by-passing said valve means, said means for further restricting said rate of flow being effected by said valve piston closing at least one of said first and second ports in response to shock in excess of said predetermined magnitude to thereby limit flow through said by-pass conduit.

3. A hydraulic shock absorber for a system for handling fluids, said shock absorber comprising a piston and a cylinder, one of which is adapted to be connected to said system and the other of which is adapted to be connected to a structure, a main fluid conduit providing communication between the two sides of said piston via a first route, a restriction in said main conduit, a by-pass conduit providing communication between said two sides of said piston via a second route and having a second restriction therein, a pressure chamber connected to one side of said piston and out of the route of said main conduit, pressure responsive valve means having one portion in said main conduit and having another portion exposed to said pressure chamber, said valve means being movable automatically to close said main conduit in response to pressure in said pressure chamber produced by shock transmitted to one of said piston and cylinder in excess of a predetermined magnitude, said valve means being non-responsive to close said main conduit in response to pressure in said pressure chamber produced by shock of said predetermined magnitude and below said predetermined magnitude.

4. A hydraulic shock absorber for a system for handling fluids, said shock absorber comprising a piston and a cylinder, one of which is adapted to be connected to said system and the other of which is adapted to be connected to a structure, a main fluid conduit providing communication between the two sides of said piston via a first route, a by-pass conduit by-passing at least a portion of said main conduit and providing communication between said two sides of said piston via a second route, a pair of control chambers in said by-pass conduit, valve means in said main conduit, said valve means having as a first portion a wall of one of said chambers and having as a second portion a wall of the other of said chambers, a first restriction in the portion of said main conduit by-passed by said by-pass conduit, a second restriction which is in said by-pass conduit between said chambers and which is substantially smaller than said first restriction, said first restriction comprising means for creating a pressure differential between said chambers to move said valve means in a direction tending to close said main conduit in response to relative movement of said piston and cylinder caused by shock transmitted to one of said piston and cylinder, the magnitude of said pressure differential varying with the magnitude of the shock, means for yieldably and resiliently resisting movement of said valve means, the force applied to said valve means by said pressure differential in response to shock in excess of a predetermined magnitude being effective to overcome the resistance of said yieldable resilient means to move said valve means to close said main conduit, the force applied to said valve means by said pressure differential in response to shock of said predetermined magnitude and below said predetermined magnitude being insufficient to overcome the resistance of said yieldable resilient means to close said main conduit.

5. A shock absorber according to claim 4, also comprising a third chamber comprising a portion of said main conduit and having a pair of ports, movement of said valve means in one direction in response to said pressured differential in said control chambers caused by shock in one direction in excess of said predetermined magnitude being effective to close one of said ports to close said main conduit leaving the other port open and movement of said valve means in an opposite direction in response to pressure differential in said control chambers caused by shock in an opposite direction in excess of said predetermined magnitude being effective to close the other of said ports to close said main conduit leaving said one of said ports open.

6. A shock absorber according to claim 5, said main conduit having a pair of restrictions one of which is located between one of said ports and one of said control chambers and between said one of said ports and one side of said piston and the other of which is located between the other of said ports and the other of said control chambers and between said other of said ports and the other side of said piston.

7. A shock absorber according to claim 6, the size of each of said restrictions being unaffected by the magnitude of said pressure differential.

8. A shock absorber according to claim 6, said third chamber communicating with a portion of said by-pass conduit on one side of the restriction therein through said one port and said one restriction, said third chamber communicating with a portion of said by-pass conduit on the other side of the restriction therein through said other port and said other restriction.

9. A shock absorber according to claim 8, said third chamber having a third reservoir port, said shock absorber also comprising a reservoir and a reservoir conduit providing communication between said reservoir and said reservoir port, said reservoir port remaining open when said valve means is moved in said one direction to close said one port and when said valve means is moved in said opposite direction to close said other port.

10. A shock absorber according to claim 9, said yieldable and resilient means comprising a pair of opposed springs biasing said valve means in opposite directions toward a normal position in which all of said ports are open.

11. A hydraulic shock absorber for connection between a structure and a system for handling fluids, said shock absorber comprising a piston and a cylinder, one of which is adapted to be connected to said structure and the other of which is adapted to be connected to said system, valve means for controlling flow of fluid between the opposite sides of said piston, said valve means comprising a valve body having a passage therein, a valve piston movable in said passage and having a pair of lands dividing said passage into a first end chamber, a center chamber having a first port, a second port and a third port, and a second end chamber, first conduit means providing communication between one side of said piston and one of said end chambers and between said one side of said piston and said first port of said center chamber, said first conduit means having a first portion for flow of fluid from said one side of said piston to said one end chamber and a second portion for flow of fluid from said one side of said piston to said first port of said center chamber, second conduit means providing communication between said other side of said piston and said other end chamber and between said other side of said piston and said second port of said center chamber, said second conduit means having a first portion for flow of fluid from said other side of said piston to said other end chamber and a second portion for flow of fluid from said other side of said piston to said second port of said center chamber, each of said second portions having a restriction therein, a by-pass conduit providing communication between the opposite sides of said piston and by-passing said center chamber and said first and second ports, said by-pass conduit having a restriction therein substantially smaller than said restrictions in said second portions, said restrictions comprising means for restricting the rate of fluid flow between said sides of said piston and for creating a pressure differential between said end chambers in response to movement of said piston, a reservoir, a reservoir conduit providing communication between said third port of said center chamber and said reservoir, said first port and said second portion of said first conduit means providing communication between said center chamber and a portion of said by-pass conduit on one side of the restriction therein, said second port and said second portion of said second conduit means providing communication between said center chamber and a portion of said by-pass conduit on the other side of the restriction therein, yieldable and resilient means for normally positioning said valve piston with said first, second and third ports uncovered when the pressure differential between said end chambers is at and below a predetermined magnitude, said valve piston being automatically movable in one direction in response to pressure differential between said end chambers in excess of said predetermined magnitude caused by movement of said piston in one direction and against the force exerted thereon by said yieldable and resilient means to cover one of said first and second ports with one of said lands and leaving the other two ports uncovered, said valve piston being automatically movable in a direction opposite to the aforesaid direction of movement of said valve piston in response to pressure differential between said end chambers in excess of said predetermined magnitude caused by movement of said piston in a direction opposite to the aforesaid direction of movement of said piston and against the force exerted thereon by said yieldable and resilient means to cover the other of said first and second ports with the other of said lands and leaving said third port and said one of said first and second ports uncovered.

12. A hydraulic shock absorber for a system for handling fluids, said shock absorber comprising a piston and a cylinder, one of which is adapted to be connected to said system and the other of which is adapted to be connected to a structure, a main fluid conduit providing communication between the two sides of said piston via a first route, a first restriction in said main conduit, a by-pass conduit providing communication between said two sides of said piston via a second route and having a second restriction therein smaller than said first restriction, a pressure chamber connected to one side of said piston and out of the route of said main conduit, pressure responsive valve means having one portion in said main conduit and having another portion exposed to said pressure chamber, said valve means being movable automatically to close said main conduit in response to a force caused by pressure in said pressure chamber which is produced by shock transmitted to one of said piston and cylinder in excess of a predetermined magnitude, means for yieldably and resiliently resisting said valve movement, said first restriction comprising means for enhancing the pressure in said pressure chamber in response to relative movement of said piston and cylinder caused by said shocks, said valve means being non-responsive to close said main conduit in response to pressure in said pressure chamber produced by shock of said predetermined magnitude and below said predetermined magnitude, said force applied to said valve means by said pressure being effective to overcome force applied to said valve means by said yieldable resilient means to move said valve means to close said main conduit, and forces less than said force being insufficient to overcome the force applied by said yieldable resilient means to close said main conduit.

References Cited in the file of this patent

UNITED STATES PATENTS

| | | |
|---|---|---|
| 2,375,377 | Mitereff | May 8, 1945 |
| 2,603,235 | Kirkham | July 15, 1952 |
| 2,723,007 | Lanphere | Nov. 8, 1955 |
| 2,807,336 | Sweeney | Sept. 24, 1957 |
| 2,869,685 | Funkhouser et al. | Jan. 20, 1959 |

FOREIGN PATENTS

| | | |
|---|---|---|
| 722,476 | France | Dec. 29, 1931 |
| 263,466 | Great Britain | Dec. 30, 1926 |
| 284,062 | Great Britain | Jan. 26, 1928 |